Patented May 8, 1945

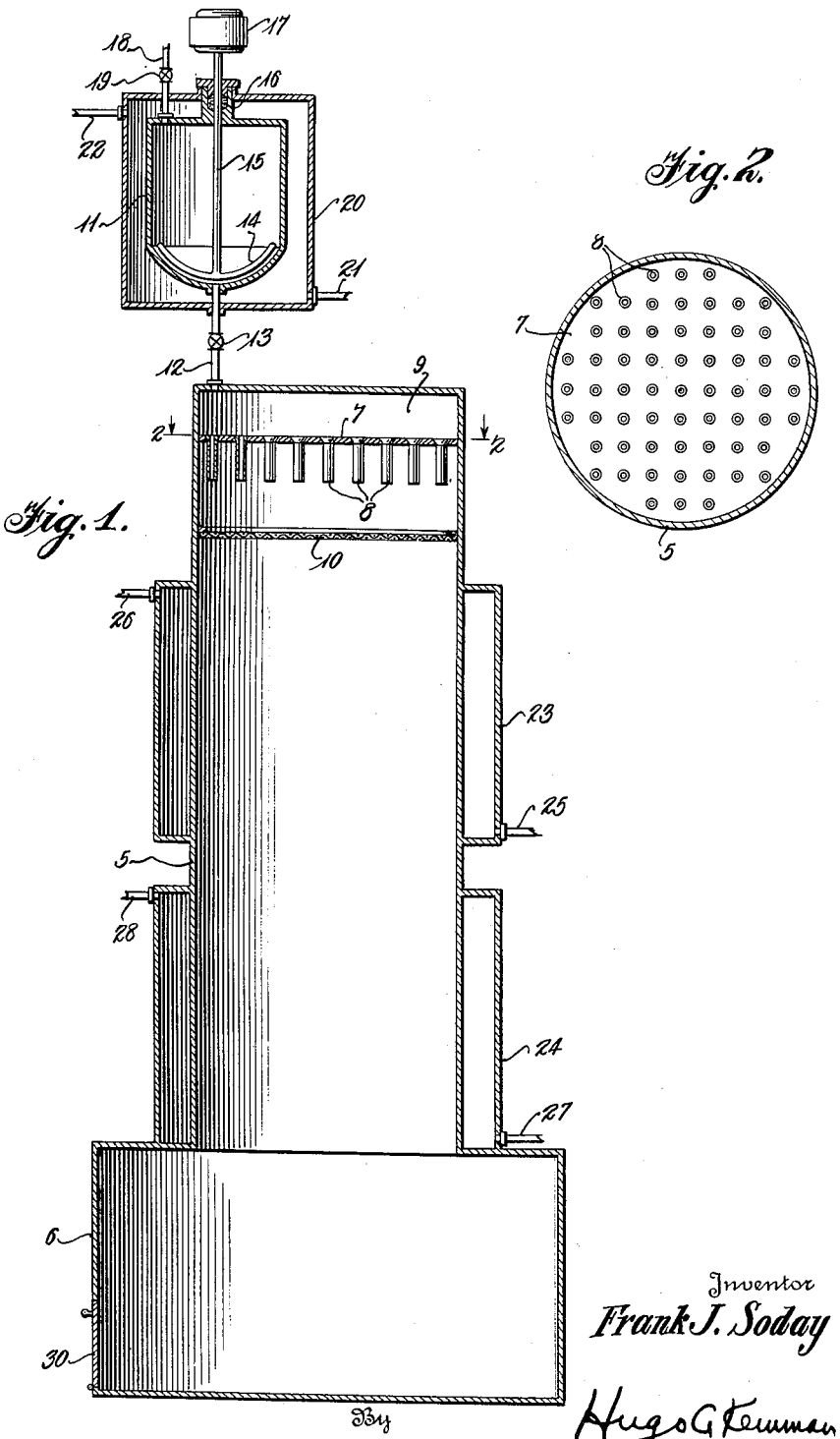

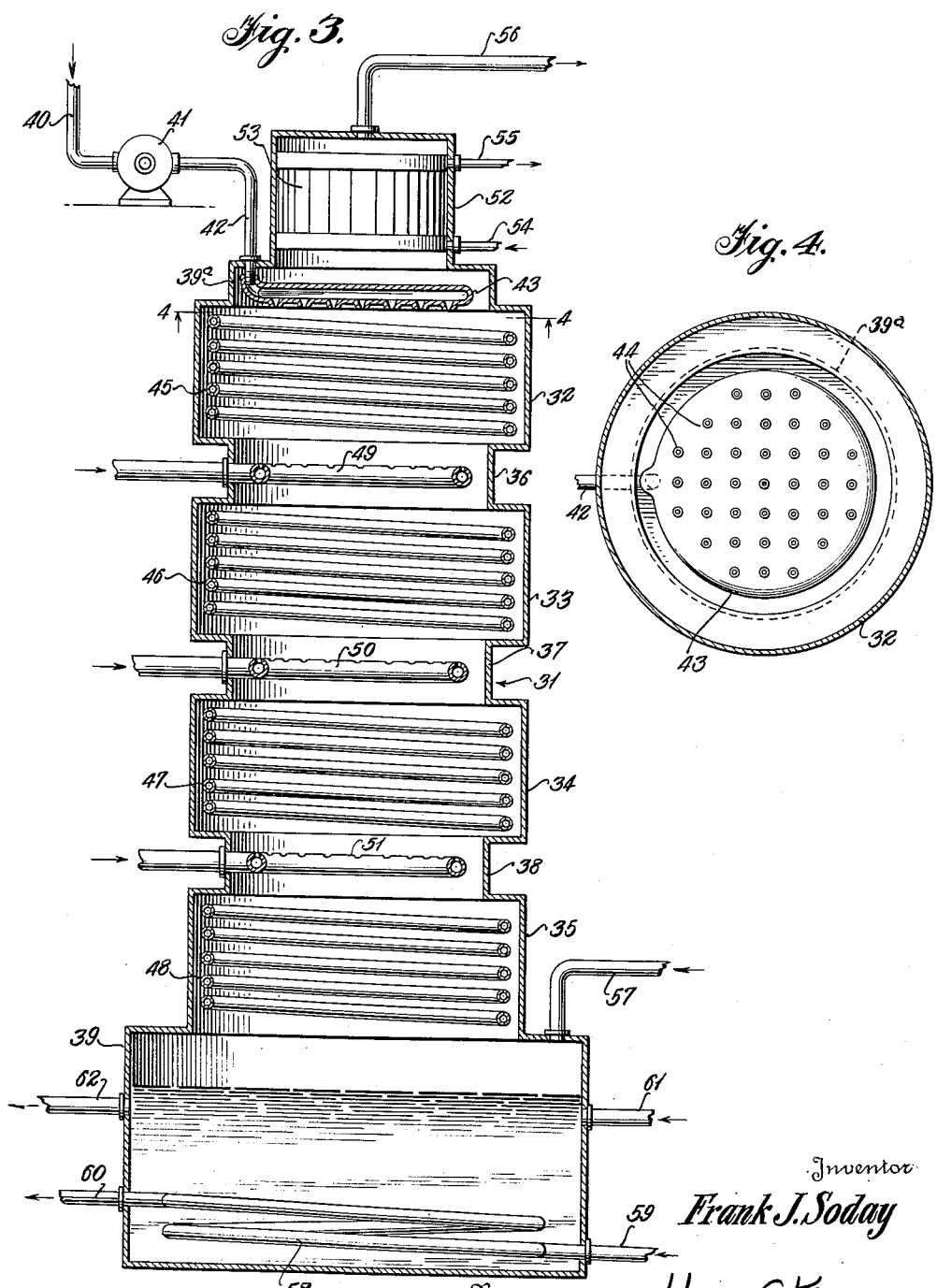

2,375,256

UNITED STATES PATENT OFFICE 2,375,256

PROCESS FOR CONTROLLING POLYMERIZATION REACTIONS

Frank J. Soday, Upper Darby, Pa., assignor to The United Gas Improvement Company, a corporation of Pennsylvania Application July 7, 1939, Serial No. 283,165

6 Claims. (Cl. 260—78)

This invention pertains generally to methods and apparatus for effecting polymerization.

It is well known in the art to prepare resins, plastics, and polymeric compounds in general by the polymerization, co-polymerization, or condensation of reactive organic compounds or mixtures of reactive compounds by the application of heat, by the use of various catalysts, or by the combined use of catalysts and heat.

In co-pending application Ser. No. 280,724 filed June 23, 1939, by Frank J. Soday, now Patent No. 2,345,013, issued March 28, 1944, there are described several methods and apparatus for effecting polymerization of resins, plastics, and polymeric compounds in which the reactant or the reaction mixture is rendered susceptible of very accurate temperature control by permitting the polymerization process to take place while the reactant or reaction mixture is in the form of a relatively thin sheet, film, or foil.

In addition to providing a very effective way of controlling reaction temperatures, the methods and apparatus disclosed in that co-pending application also make possible the production of polymerized products in thin film or sheet form in readiness for commercial use.

The present invention relates more particularly to method and apparatus for obtaining polymerization products of high purity, free from discoloration and particularly in granule or particle form.

This is accomplished, generally speaking, by effecting polymerization of the reactant or reaction mixture while it is passing in the form of thin streams or separate particles or droplets through a reaction tower and effecting the desired control of the reaction temperature of the material while it is passing through the tower.

The methods and apparatus of this invention present certain advantages over the methods and apparatus disclosed in the aforementioned co-pending application.

For example, when the reactant or reaction mixture is dealt with in the form of a thin sheet, film, or foil, temperature control can only be effected in connection with the upper and lower or inner and outer surfaces of the sheet, film, or the like.

Furthermore, it is difficult to effect a type of reaction which involves the introduction of additional material or materials to the initial reactant or reaction mixture at one or more intermediate points during the polymerization process when the initial material is moving in the form of a thin sheet or film on a supporting surface.

This difficulty, of course, is due to the fact that only one surface of the thin sheet or film is exposed. When the reactant or reaction mixture is passing through a polymerizing tower in the form of individual particles or droplets, the cross sectional area of the particles or droplets in any direction is extremely small, and the entire exterior surface of each particle is completely exposed.

Temperature changes, therefore, may be very readily effected and the introduction of additional materials at any desired intermediate points throughout the length of the reaction tower may be easily accomplished and will result in a thorough mixing or commingling of the initial and additional materials.

It is common practice to prepare resins and plastics from reactive organic compounds by introducing the reactant or reaction material into a suitable vessel, or the like, to permit carrying out the polymerization or condensation process therein.

Although it is possible to successfully effect polymerizatiton in this way when dealing with small batches of material, such as the small volumes of materials usually dealt with in laboratories, numerous disadvantages are encountered in attempting to effect polymerization or condensation of large quantities of materials in this way.

For example, many of the polymerization and condensation reactions are exothermic in nature. In such reactions, it is generally necessary to initially heat the reactant or reaction mixture in order to start the reaction. Once started, however, the reaction proceeds vigorously and with the evolution of a considerable amount of heat. The temperature of the reaction mass, therefore, becomes so high that the reaction product is defective in many respects.

When reactions which are exothermic in nature are conducted on a large scale in large capacity vessels, the ratio of the volume of the reactant or reaction mixture to the heat exchange surface of the reaction vessel is quite large. Therefore, the heat dissipated during the course of the reaction is not adequate, and the reaction temperature exceeds a safe maximum.

This overheating of the reactant or reaction mixture frequently results in the production of dark colored polymers as well as polymers which are defective in such other respects as having entrapped therein bubbles of gas or vapor and as possessing a relatively low molecular weight.

As an illustrative example of the exothermic nature of some polymerization reactions, mention may be made of the reaction between monomeric styrene and maleic anhydride. A mixture of small quantities of these materials, when heated to a temperature of 110° C., reacts to produce resin of good mechanical properties. It is necessary to heat the material to a temperature of approximately 110° C. in order to initiate the reaction. After the reaction has once started, it proceeds very vigorously with the evolution of a considerable amount of heat. To obtain a pure, water-white, transparent, high melting resin, it is necessary to prevent the temperature of the reaction material from becoming excessive, and this may be accomplished by immersing the reaction vessel in a cooling medium, such as a cooling bath, when the quantity of reactant or reaction mixture is relatively small. However, when large quantities of styrene and maleic anhydride are employed, it becomes difficult to check the rise in temperature resulting from the initiation of the reaction and, generally, a defective reaction product is obtained. Because of the excessive temperature during the polymerization process, the reaction product if found to be non-homogeneous in nature, objectionably discolored, and to contain entrapped gas or vapor bubbles, all of which often make the resultant resin product unsuitable for many uses.

I have discovered that reactions, such as the above described exothermic polymerization reaction, can be maintained within the desired temperature levels by permitting the reaction to take place in a tower through which the reactant or reaction mixture is passed and in which the temperature may be very accurately controlled. For example, the reactant or reaction mixture may be allowed to descend through a vertical tower in the form of streams of small cross-sectional area or in the form of individual particles or droplets. The reactant or reaction material may be fed in any desired manner into a tower at its top and suitable means may be employed to divide the thus fed material into the desired stream formations, particles, or droplets which are permitted to descend through the tower.

The temperature in any portion or portions of the tower may be controlled in various ways in order to accomplish the desired reaction free from the aforementioned disadvantages. For example, the upper portion of the tower may be provided with means for effecting either direct or indirect heat exchange between a heating medium and the reactant or reaction mixture descending through this portion of the tower. To effect direct heat exchange, hot gases or liquids may be passed through the upper portion of the tower. To effect indirect heat exchange, the upper portion of the tower may be jacketed exteriorly or coils may be arranged within the tower. Heated gases or liquids may then be passed through the jacket or jackets and the coil or coils. In either of these ways, the upper section of the tower may be maintained at any desired temperature which is sufficiently high to initiate the reaction.

When the reaction is accompanied by the evolution of an excessive amount of heat, it may be advisable to provide a lower or subsequent portion of the tower with a cooling zone in which the reaction, which has been initiated in the heating zone, may be checked to such an extent as to produce a reaction product which is free from discoloration, gas bubbles, and other defects. This cooling zone may be produced by any of the means referred to hereinbefore as being suitable for providing the upper portion of the tower with a heating zone. The only change which naturally must be made is to employ a cooling medium of an appropriate low temperature.

After the passage of the reactant or reaction mixture through the tower, the reaction products may be collected in a receiving zone associated with the lower end of the tower to await withdrawal and subsequent use. Alternatively, it may be desirable to effect further reactions or modifications of the reaction product produced within the tower. The receiving zone associated with the lower end of the tower may be utilized to effect these further reactions or modifications, or the reaction product produced within the tower may be delivered to other apparatus, not shown, which is more suitable for effecting the further reaction or modification.

In effecting certain polymerization or condensation reactions, or in dealing with certain reactants or reaction mixtures, it may be necessary to prolong the downward passage of the materials through the tower. The descent of the materials through the tower may be delayed to any extent desired by arranging within the tower suitable baffles, or suitable packing or filling materials or objects of any desired type. The baffles, packing, or filling may be arranged throughout the entire length of the tower or in any portion or portions of the same.

In addition to effecting control of temperature conditions in different portions of the tower by the introduction of heating and/or cooling gases and liquids, additional reactants, provided they are gases, liquids, or finely divided solids, may be introduced either with or in combination with the cooling and/or heating gases and liquids or independently of such cooling or heating gases or liquids. In this way, it is possible to introduce such additional materials as catalysts, modifying agents, dyes, plasticizing agents, or the like. These additional materials also may be introduced in the receiving zone associated with the lower end of the tower to effect further reactions or modifications of the reaction product produced within the tower.

When the reactant or reaction mixture, the introduced cooling and/or heating medium, or the introduced additional reactant or modifying material are rather volatile, suitable condensers or precipitating devices may be associated with or arranged within the upper portion of the tower for use in condensing the volatilized reactant, or the like. The condensate may be returned in any desired manner to the reaction portion of the tower.

Since polymerization reactions are for the most part exothermic while condensation reactions are for the most part endothermic, it will be apparent that the processes herein described are generally most suitable for polymerization reactions. However, in the description and claims which follow, the term "polymerization" is intended to additionally embrace those condensation reactions which are exothermic in nature, and the term "polymer" is intended to embrace products which result from condensation reactions that are exothermic in nature.

Further features of the invention reside in the construction, arrangement, and combinations of parts and in the steps, sequences, and combinations of steps, all of which together with further features will become more apparent to persons skilled in the art as the description proceeds and upon reference to the drawings in which like reference characters have been appended to like parts in the various figures, and in which Figure 1 is a vertical sectional view of a reaction tower and its associated instrumentalities embodying this invention;

Figure 2 is a horizontal sectional view taken on line 2—2 of Fig. 1;

Figure 3 is a vertical sectional view of a modified form of reaction tower embodying this invention with its associated instrumentalities; and Figure 4 is a horizontal sectional view taken on line 4—4 of Fig. 3.

Referring now to the form of the invention disclosed in Figs. 1 and 2, the reference character 5 designates the reaction tower through which the reactant or reaction material is permitted to descend while undergoing the polymerization process. The lower end of the tower 5 has suitably associated therewith a reaction product receiving chamber 6 from which the products may be removed in any desired manner.

The upper portion of the reaction tower 5 has arranged therein any suitable means which will result in dividing the material or materials to be passed through the tower into any desired form of small area streams, particles, or droplets. It will be appreciated that a wide variety of means are available for accomplishing this desired result. In Figs. 1 and 2 there is illustrated a distributing plate or pan 7 which is suitably apertured and which has arranged in its several apertures the depending discharge nozzles, tubes, or nipples 8. It is the function of this plate or pan 7 to uniformly distribute the reactant or reaction mixture throughout the entire horizontal cross section of the tower or chamber. It will be appreciated that this uniform distribution of the reactant material or mixture may be furthered by having the upper ends of the tubes, nipples, nozzles, or the like 8 terminate above the top face of the plate or pan 7. This top plate or pan 7, therefore, would be flooded at all times and the reactant material or mixture would be compelled to overflow into the bores of the tubes, or the like, 8. It will be appreciated that the bores of these tubes, nipples, or nozzles 8 may be of any desired cross-sectional shape so as to produce streams of any desired size or shape. In fact, the bores of these tubes, or the like, 8 may be of such small diameter as to merely permit the materials to be discharged from their lower ends in the form of droplets of any desired volume.

The rate of flow of the material or materials to be polymerized into the reaction chamber may be regulated as desired. For example, by applying pressure to the reaction chamber, the flow through the tubes, nipples, or nozzles 8 may be accelerated. Other means may likewise be employed to accelerate or retard the rate of feed of the material or materials to be polymerized.

Of course, the rate of feed of the material or materials to be polymerized into the upper end of the reaction tower 5 may be sufficiently rapid relative to the rate of discharge through the apertures of the plate or pan 7 to cause the space above the plate or pan 7 to act as a supply reservoir for the remainder of the tower. With such an operation, this space or reservoir 9 will be full or substantially full of the material or materials throughout the operating period of the tower.

If the tubes, nozzles, or nipples 8 are employed in connection with the plate 7 to merely uniformly distribute the material or materials throughout the transverse area of the tower and to partially divide the material into a multiplicity of streams of too large a cross-sectional area to be properly treated in the reaction portion of the tower, a screen, or an apertured or slotted member 10 may be arranged beneath the discharge ends of the tubes, or the like, 8. This screen, or like element, 10 functions to break up or divide the material into small segments, particles, droplets, or very fine streams. The material leaving the dividing member 10 will be in proper form to be treated within the tower 5.

It will be understood that the plate or pan 7 and its discharge tubes, nozzles, or nipples 8 may be used either with or without the further dividing means 10. Also, the dividing means 10 may be employed by itself and the plate 7 with its discharge devices 8 dispensed with. In either event, the devices 7, 8, and 10 are to be so constructed as to either severally or collectively divide the material into the desired small streams or increments for passage through the tower 5.

When a single reactant is to be subjected to a polymerization process while passing through the tower 5, the single reactant may be fed into the upper end of the tower from any suitable source of supply, such as a plain storage tank. The single reactant may be fed into the upper end of the tower through a single inlet pipe or through one or more spraying devices connected to the supply.

When more than one reactant is to be combined to form a reaction mixture, the several reactants may be fed into a suitable mixing chamber 11 which is connected by the pipe 12 to the upper end of the tower 5 or to the reservoir 9. Suitable valve means 13 may be positioned within the pipe line 12 to control the flow of mixture to the tower. A suitable agitating and mixing device 14 may be located in the chamber 11 and driven by the shaft 15 which passes through a suitable packing 16. A motor 17, or other power transmission means, may be connected to the projecting portion of the shaft 15. The several reactants to be mixed in the chamber 11 may be introduced through the pipe line 18 which is provided with a suitable control valve mechanism 19.

If desired, the mixing chamber 11 may be enclosed in a jacket 20 through which a suitable heating or cooling medium may be circulated by means of the pipes 21 and 22. It will be appreciated that mixing of the several reactants to form the desired reaction material may be accompanied by the evolution of a considerable amount of heat, and for that reason it might be desirable to retard or control the temperature within the mixing chamber 11. Alternatively, it may be desired to initiate the reaction within the mixing chamber 11. In such cases heating and cooling fluids respectively may be passed through the jacket 20.

In Fig. 1, the tower 5 is shown with jackets 23 and 24 surrounding the same. The jacket 23 is provided with flow pipes 25 and 26. The jacket 24 is provided with flow pipes 27 and 28. By passing a suitable heat exchange medium through either or both of the jackets 23 and 24, it will be possible to very accurately control the temperature in the upper and lower portions of the tower 5. If it is desired to initiate the polymerization reaction in the upper portion of the tower 5, a heated gas or liquid may be passed through the jacket 23. If it is desired to heat both the upper and lower portions of the tower 5, for instance, to raise the temperature in these two portions of the tower to different levels, different temperatured heating mediums may be passed through both of the jackets 23 and 24. If it is desired to heat the upper portion of the tower and cool the lower portion, a heating medium may be circulated through the jacket 23 while a cooling medium is circulated through the jacket 24. In certain operations, the reaction may be initiated within the mixing chamber 11 so that by the time the materials start descending through the tower 5 it becomes necessary to check the reaction by lowering the temperature within the tower. This may be accomplished by passing a single cooling medium through both of the jackets 23 and 24 or two different mediums at different temperatures may be passed respectively through the jacket 23 and the jacket 24. When it is not necessary to differentiate between the temperatures of the upper and lower portions of the tower 5, a single jacket may be associated with the entire length of the tower.

After the polymerization process is fully carried out in the tower 5, the reaction products may be accumulated within the receiving chamber 6 and removed therefrom in any desired way, as by means of a door 30.

A modified form of reaction apparatus is disclosed in Figs. 3 and 4. The tower 31 in this modification is divided into a plurality of heat exchange sections 32, 33, 34 and 35 which are interconnected by intermediate portions 36, 37, and 38. The lower end of the tower 31 has associated therewith a receiving chamber 39 about which more will be said at a later point.

The material or mixture of materials to be polymerized may be fed into the upper portion 39a of the tower by means of a pipe line 40, which extends from a suitable source of supply, the pump 41, the pipe line 52, and the delivery device 43.

This delivery device 43 is illustrated in Figs. 3 and 4 as comprising a spraying nozzle, or the like, which is formed with a suitable number of discharge apertures 44. This discharge device 43 is intended to function as a means for breaking up the reactant or reaction mixture into the desired small streams or increments for passage downwardly through the tower 31. It will be appreciated, therefore, that a distributing plate and/or a dividing device, such as the elements designated by the reference characters 7 and 10 in Fig. 1, may be associated with the discharge device 43 if desired. It further will be appreciated that mixing and heat exchange mechanism, such as that disclosed in Fig. 1 and connected to pipe line 12, may be attached to supply pipe 40 in the apparatus disclosed in Fig. 3.

The heat exchange portions 32, 33, 34, and 35 are illustrated as having arranged therein coils 45, 46, 47, and 48, respectively. These coils are intended to have passed therethrough heated or cooled gases or liquids in any desired combination or sequence. For example, one or more of the coils, starting with the upper coil 45, may have a heated gas or liquid passed therethrough to initiate the reaction while the remaining coil or coils may have passed therethrough a gas or liquid at a sufficiently low temperature to check the reaction in the lower part of the tower. As an alternative operation, all of the coils may have a cooling medium passed therethrough, or all of the coils may have a heating medium passed therethrough. The temperature control effected by means of the heat exchange coils 45 to 48, inclusive, depends entirely upon the type of reaction being carried out and the materials being dealt with.

The intermediate portions 36, 37, and 38 of the tower 31 are illustrated as having arranged therein the feeding or introducing devices 49, 50, and 51. These feeding devices may be employed in conjunction with or exclusive of the coils 45 to 48, inclusive, to accomplish control of the reaction temperature within the tower 31. For example, heated or cooled gases or liquids may be discharged through the devices 49 to 51, inclusive, in any desired combination or sequence to effect temperature control. One operation might be to discharge a heated gas or liquid through the device 49 to elevate the temperature of the reactant or reaction mixture while passing through the upper portion of the tower. The remaining discharge devices 50 and 51 might feed into the tower a cooled gas or liquid to bring about a lowering of the temperature within the lower portion of the tower.

As a further modification, the coils 45 to 48, inclusive, may be employed for controlling the reaction temperature within the tower 31 and the devices 49, 50, and 51 may be employed for introducing additional reaction or modifying materials into the tower to comingle or combine with the reactant or reaction material fed into the upper portion of the tower through the discharge device 43. The additional reaction or modifying material or materials introduced into the tower through the discharge devices 49 to 51, inclusive, may be in the form of gases, liquids, or finely divided solids, or any desired combination of any two or more of these different types of materials.

When the reactant or reaction mixture fed into the tower through the upper discharge device 43 has a tendency to volatilize or where the material or materials fed into the tower through the devices 49 to 51, inclusive, have a tendency to volatilize or are in a gaseous form, it may be desirable to condense the vapors which thereupon rise through the tower counter-currently to the descending liquid or liquids. The tower 31, therefore, may have a condensing section 52 associated with its upper end. This section has a condensing coil 53 mounted therein and provided with inlet and outlet pipes 54 and 55, respectively. Any vapors which are not condensed within the section 52 may be carried off through the discharge line 56. The condensate, of course, will be returned by gravity to the upper portion 39a of the tower 31. If the upper surface of the discharge device 43 is imperforate, the condensate will spread out on the same and flow off of the edges. If it is desired to more uniformly distribute the condensate with the reactant or reaction mixture being discharged into the tower by the device 43, this device may have formed therein tubular passages which will extend from the upper surface to the lower surface of the device. These passages may be distributed in any desired manner throughout the area of the discharge device 43.

As has been explained in connection with the apparatus disclosed in Fig. 1, the material finely discharged into the receiving chamber located at the lower end of the tower may be the desired final polymer or reaction product or it may be desirable to effect further reaction or modification of the material delivered by the tower into the receiving chamber.

The receiving chamber 39 is conditioned to make possible to performance of these further reactions or modificatiions. For example, catalysts, modifying agents, dyes, plasticizing agents, or the like, may be introduced into the receiving chamber 39 through the pipe line 57. These added materials may take the form of gases, liquids, or finely divided solids. If the added materials are gases, it may be desirable to cool the reaction product located within the receiving chamber 39 to increase the gas absorbing properties of the same. This cooling may be effected by means of a coil 58 provided with inlet and discharge lines 59 and 60, respectively. It further may be desirable to either raise or lower the temperature of the reaction product of the tower 31, i. e. the material accumulating in the receiving chamber 39, to effect further reactions or modifications of this material by means of liquids or solids introduced into the chamber 39 through the pipe line 57. The coil 58 may also be used for this purpose.

If it is desired to withdraw from the chamber 39 a polymer-solvent solution, a solvent may be introduced into the chamber 39 through the pipe line 61 and the polymer-solvent solution withdrawn from the chamber through the pipe line 62. Dissolved resins or plastics may be obtained in this way.

To effect certain reactions, it may be desirable to introduce a gaseous mixture into the receiving chamber 39 through the pipe line 57 and permit this introduced gas to pass upwardly through the tower 31 counter-currently with respect to the descending reactant or reaction mixture. This introduced gas may be withdrawn in its entirety from the extreme upper end of the tower through the discharge line 56 or this counter-currently flowing gas may be condensed by means of the condenser coil 53.

When it becomes desirable to retard the descent of the reactant or reaction mixture through either the tower 5 of Fig. 1 or the tower 31 of Fig. 3, suitable baffles, packing, or filling material may be arranged in any desired way and in any portion or portions of the tower. This feature of retarding the flow of material or materials being polymerized may be employed as a part of the means for effecting temperature control within the tower.

The processes above enumerated are especially applicable for the production of resinous or plastic materials such, for example, as those of the maleic anhydride-unsaturated compound type, or the polystyrol type.

Illustrative of the maleic anhydride-unsaturated compound type of resins which may be formed in accordance with the teachings of this invention may be mentioned resins produced by the reaction between maleic acid or anhydride, fumaric acid, itaconic acid, citraconic acid, phenyl-maleic acid, benzyl-maleic acid, ethyl-maleic acid, dibenzyl-maleic acid, or the anhydrides thereof, or other derivatives thereof, such as an ester or an acid chloride, or any mixture containing two or more of these compounds, and compounds containing a single reactive double bond or a non-conjugated system of reactive double bonds, such as olefines including indene, methyl styrene, isobutylene, and cyclopentene, olefine derivatives such as hydroxy styrene, acrylic acid, esters of acrylic acid, and derivatives of acrylic acid and acrylic acid esters, methacrylic acid and methacrylic acid esters, unsaturated aldehydes such as acrolein, croton aldehyde, or furfuraldehyde, vinyl derivatives, such as vinyl chloride, vinyl acetate, vinyl ethers, vinyl esters in general, or derivatives thereof, polyvinyl derivatives, unsaturated ketones such as vinyl methyl ketone, coumarone, cinnamic acid and/or esters or derivatives thereof, or any mixture containing two or more of these compounds.

Generally speaking, it may be said that the above type of reactions involve a compound having the following formula

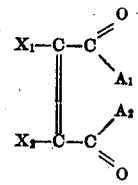

wherein $X_1$ and $X_2$ represent hydrogen, halogen, alkyl, aryl, or aralkyl groups, or the sulfonic acid radicals, and $A_1$ and $A_2$ represent hydroxyl, halogen, oxygen-alkyl, oxygen aryl, or $A_1$ and $A_2$ together represent oxygen, with a compound capable of being polymerized and containing a single reactive

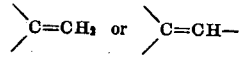

group, or a system of non-conjugated reactive double bonds.

Illustrative of the polymer type of resins which may be produced in accordance with this invention may be mentioned those resins prepared by polymerization or condensation of reactive organic compounds such as olefines, including styrenes, isobutylene, and cyclopentene, diolefines, such as butadiene, isoprene, and cyclopentadiene, acrylic acid, esters of acrylic acid, and derivatives of acrylic acid or acrylic acid esters, methacrylic acid, esters of methacrylic acid, and derivatives of methacrylic acid or methacrylic acid esters, unsaturated aldehydes, such as acrolein, croton aldehyde, or furfuraldehyde, vinyl derivatives, such as vinyl chloride, vinyl ether, and vinyl esters, polyvinyl derivatives such as polyvinyl alcohol, polyvinyl esters, polyvinyl halides, or polyvinyl ethers, unsaturated ketones, such as vinyl methyl ketone, and the like.

A preferred method for the production of the maleic anhydride-unsaturated compound type of resins consists of gently heating the mixture of reactants until complete solution is attained, suitably at temperatures in the range of 30° to 100° C., followed by combining the reactants at a more elevated temperature, suitably in the range of 100° to 200° C., and preferably in the range of 110° to 130° C., for the desired period of time.

The reaction time may be varied over very wide limits, the nature of the product obtained being directly dependent upon the length of the reaction time.

In general, it may be said that the processes and apparatus embraced by this invention are best adapted to those reactions which take place exothermically, although this invention is not to be limited to those reactions alone.

Illustrative of the problems encountered in the preparation of resins from materials which react exothermically, and of the advantages to be derived from effecting such reactions by the processes herein described, are given the following examples:

*Example I*

A mixture of 105 parts of monomeric styrene and 120 parts of maleic anhydride was placed in a reaction vessel equipped with a stirrer, refluxing facilities and temperature measuring means. The temperature of the reaction mass was slowly increased by circulating hot water around the reaction vessel accompanied with vigorous agitation of the reacting mixture. When the reaction mixture reached a temperature of 90° C. it was noticed that the reaction mixture became somewhat viscous. When the temperature of the reaction mixture reached 95° C., a vigorous exothermic reaction set in and the temperature of the mass rose rapidly thereafter. In an effort to control the temperature of the reaction mass, the reaction vessel was immersed in a cooling bath maintained at −20° C. but it was observed that the temperature within the reaction mass increased rapidly to a maximum temperature of 230° C. Thereafter, the reaction temperature dropped to approximately 150° C. at which point the cooling bath was removed from the reaction vessel. This resulted in a subsequent rapid increase in temperature within the vessel indicating the vigorous exothermic nature of the reaction.

The styrene-maleic anhydride resin obtained from the reaction vessel was quite hard and tough but of very poor quality, due to its non-homogeneous nature. Portions of the resinous mass were found to be deep brown in color while other portions were colorless. The unsatisfactory nature of this method of temperature control was thus clearly demonstrated.

Example II

The foregoing experiment using monomeric styrene and maleic anhydride was repeated in similar reaction equipment. In this experiment, however, a cooling bath consisting of a mixture of solid carbon dioxide and acetone, and having a temperature of approximately −80° C. was utilized to effect control of the exothermic reaction. It was found that even with a cooling bath maintained at this low temperature, the exothermic nature of the reaction could not be controlled, the reaction mixture reaching a maximum temperature of approximately 225° C. The material obtained from the reaction vessel after the completion of the reaction was of inferior quality, dark brown in color, and contained entrapped air bubbles.

The results of Experiments 1 and 2 indicate that the reaction of maleic anhydrides or other materials of this general class with unsaturated compounds cannot be carried out in the usual manner due to the highly exothermic nature of the reaction.

By use of the processes herein described a resinous product in granule or particle form entirely free of color and possessing superior physical properties was prepared, as shown by the following illustrative example.

Example III

A mixture of 105 parts of monomeric styrene and 120 parts of maleic anhydride was heated to a temperature of approximately 90° C. in a reaction vessel equipped with heating coils and a stirrer. The mixture at this temperature was fed to the top of a tower and allowed to drop therethrough in the form of droplets. The temperature within the tower was maintained at 120° C. by means of heating and cooling gases circulated through heating and cooling coils positioned in and around the tower. The exothermic reaction was thus maintained within temperature limits necessary for preventing the formation of defective products.

The styrene-maleic anhydride resin collected at the bottom of the tower was in the form of clear transparent colorless granules possessing physical properties of a superior nature to those obtained in Examples I and II above.

For the purpose of my invention maleic acid may be considered the full equivalent of maleic anhydride.

The various apparatus, and methods of effecting polymerization of the various materials in finely divided form with adequate temperature control, as herein particularly described represent specific examples of applying the invention which is intended to be limited only as required by the prior art. Therefore, changes, omissions, additions, substitutions, and/or modifications may be made without departing from the spirit of the invention.

I claim:

1. A process for the production of resinous polymer by polymerization in liquid phase, and with the application of heat, of resin-forming material which polymerizes with the evolution of heat, comprising causing said polymerizable resin-forming material to fall by gravity from a plurality of laterally spaced points and thus in finely divided form through a heating zone, applying heat to said material in said finely divided form as it falls through said heating zone to promote the polymerization thereof with resulting evolution of heat, continuing said fall of said material in said finely divided form through a cooling zone, checking the rate of said polymerization of said falling material by the abstraction of heat therefrom in said cooling zone, and collecting the polymerized product.

2. A process for the production of resinous polymer involving the application of heat to liquid phase resin-forming material which polymerizes with the evolution of heat, comprising causing said liquid phase resin-forming material to fall by gravity through a heating zone in finely divided form comprising small segments from a plurality of laterally spaced points, applying heat to said material in said segments while falling through said heating zone to start the polymerization thereof with resulting evolution of heat, continuing said fall of said material in said segments through a cooling zone, reducing the rate of said polymerization in said falling material by the abstraction of heat therefrom in said cooling zone, and collecting the polymerized product.

3. A process for the polymerization, with the application of heat, of liquid phase resin-forming material which polymerizes with the evolution of heat, which comprises causing said material to fall by gravity in finely divided particle form through a heating zone from a plurality of laterally spaced points, applying heat to said material while falling in said particle form to promote the polymerization thereof with resulting evolution of heat, continuing the fall of said material in particle form through a cooling zone, withdrawing heat from said falling material in said cooling zone to reduce the rate of said polymerization, and collecting the polymerized product.

4. A process for the production of resinous polymer by the polymerization of liquid phase resin-forming material which polymerizes exothermically, said process involving the application of heat to said material, which comprises causing said material to fall by gravity through a heating zone in finely divided form comprising a plurality of streams of small cross sectional area falling in space through said heating zone from a plurality of laterally spaced orifices, applying heat to said material while falling in said streams through said heating zone to promote the exothermic polymerization thereof, continuing the fall of said material in said streams through a cooling zone, checking the rate of said exothermic polymerization of said falling material in said streams by the abstraction of heat therefrom in said cooling zone, and collecting the polymerized product.

5. A process for the production of resinous polymer by the polymerization of liquid phase resin-forming material which polymerizes exothermically, said process involving the application of heat to said material, which comprises causing said material to fall by gravity through a heating zone in droplet form from a plurality of laterally spaced openings, applying heat to said material as it falls in said droplet form through said heating zone to cause said exothermic polymerization thereof, continuing the fall of said material in said droplet form through a cooling zone, checking the rate of said exothermic polymerization of said falling material by abstracting heat therefrom in said cooling zone, and collecting the polymerized product.

6. A process for the production of resinous polymer by the polymerization of a liquid phase mixture of styrene and maleic anhydride, said process involving the application of heat to said mixture resulting in exothermic polymerization, which comprises causing said mixture to fall from a plurality of laterally spaced points by gravity and thus in finely divided form through a heating zone, applying heat to said mixture in said finely divided form as it falls through said heating zone to promote the exothermic polymerization thereof, continuing said fall of said material in said finely divided form through a cooling zone, checking the rate of said exothermic polymerization of said falling material by the abstraction of heat therefrom in said cooling zone, and collecting the polymerized product.

FRANK J. SODAY.